United States Patent
Agro et al.

(10) Patent No.: US 12,052,314 B2
(45) Date of Patent: Jul. 30, 2024

(54) DEVICE AND METHOD FOR STORING AND SHARING DATA FROM OBJECTS CONNECTED TO AN INTERNET NETWORK, AND METHOD FOR RESTORING DATA COMING FROM CONNECTED OBJECTS

(71) Applicant: Orange, Issy-les-Moulineaux (FR)

(72) Inventors: Roberto Agro, Chatillon (FR); Halim Bendiabdallah, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/464,525

(22) PCT Filed: Nov. 22, 2017

(86) PCT No.: PCT/FR2017/053200
§ 371 (c)(1),
(2) Date: May 28, 2019

(87) PCT Pub. No.: WO2018/100269
PCT Pub. Date: Jun. 7, 2018

(65) Prior Publication Data
US 2019/0289066 A1     Sep. 19, 2019

(30) Foreign Application Priority Data
Nov. 29, 2016   (FR) ...................................... 1661658

(51) Int. Cl.
*H04L 67/104* (2022.01)
*H04L 69/18* (2022.01)
*H04W 4/70* (2018.01)

(52) U.S. Cl.
CPC ............ *H04L 67/104* (2013.01); *H04L 69/18* (2013.01); *H04W 4/70* (2018.02)

(58) Field of Classification Search
CPC ......... H04L 29/08; H04L 69/18; H04L 67/04; H04W 4/70
(Continued)

(56) References Cited

U.S. PATENT DOCUMENTS

| 2007/0076625 A1* | 4/2007 | Tahara | .............. H04L 29/12028 370/252 |
| 2014/0164586 A1* | 6/2014 | Dankberg | .......... G06Q 30/0207 709/223 |

(Continued)

FOREIGN PATENT DOCUMENTS

WO        2011148095 A1    12/2011

OTHER PUBLICATIONS

English translation of the Written Opinion dated Jan. 17, 2018 for corresponding International Application No. PCT/FR2017/053200, filed Nov. 22, 2017.

(Continued)

*Primary Examiner* — Sibte H Bukhari
(74) *Attorney, Agent, or Firm* — David D. Brush; Westman, Champlin & Koehler, P.A.

(57) ABSTRACT

A device and a method for storing and sharing data from objects connected to an Internet network, and a method for restoring data coming from objects connected to an Internet network. A storage and sharing device is implemented in the network and enables a control device connected to the network to browse among the stored data and to command reading of a selected item of data in the data storage and sharing device by a restoring device connected to network. The data storage and sharing device includes interfaces for loading data, each interface receiving data from at least one object connected to the Internet network. Hence, a communication terminal can access, by using a single device, data coming from all of the connected objects thereof even when (Continued)

these objects use different communication protocols and/or when the communication terminal does not use the communication protocol of the connected object.

11 Claims, 5 Drawing Sheets

(58) Field of Classification Search
USPC .......................................................... 709/201
See application file for complete search history.

(56) References Cited

U.S. PATENT DOCUMENTS

| | | |
|---|---|---|
| 2014/0359035 A1 | 12/2014 | Wang et al. |
| 2015/0019714 A1* | 1/2015 | Shaashua ............ H04L 12/2818 709/224 |
| 2016/0057565 A1* | 2/2016 | Gold ..................... H04W 4/023 455/41.1 |

OTHER PUBLICATIONS

International Search Report dated Jan. 17, 2018 for corresponding International Application No. PCT/FR2017/053200, filed Nov. 22, 2017.
Written Opinion of the International Searching Authority dated Jan. 17, 2018 for corresponding International Application No. PCT/FR2017/053200, filed Nov. 22, 2017.

* cited by examiner

DEVICE AND METHOD FOR STORING AND SHARING DATA FROM OBJECTS CONNECTED TO AN INTERNET NETWORK, AND METHOD FOR RESTORING DATA COMING FROM CONNECTED OBJECTS

CROSS-REFERENCE TO RELATED APPLICATIONS

This Application is a Section 371 National Stage Application of International Application No. PCT/FR2017/053200, filed Nov. 22, 2017, the content of which is incorporated herein by reference in its entirety, and published as WO 2018/100269 on Jun. 7, 2018, not in English.

FIELD OF THE DISCLOSURE

The invention relates to a device and a method for storing and sharing data from objects connected to an Internet network in a local area network, and to a method for rendering data coming from objects connected to an Internet network.

BACKGROUND OF THE DISCLOSURE

The field of connected objects is expanding rapidly. Numerous connected objects are flooding into our surroundings: home, office, ourselves, etc. These are in particular communicating sensors such as thermostats, weather stations, weighing scales, etc.

The Internet of Things is one sector thereof experiencing strong growth, which is giving rise to numerous players offering a multitude of connected objects. Connected objects are therefore designed and supplied by highly varied companies. Each supplier of connected objects generally develops its own device for consulting and controlling these connected objects (its own application and/or its own user interface) and uses communication protocols that are either proprietary or in accordance with a standard such as LoRa, SigFox, etc. Users thus have to adapt to each application if they have a plurality of objects, because the connected objects are not interoperable.

SUMMARY

One of the aims of the present invention is to provide improvements with respect to the prior art.

One aim of the invention is a device for storing and sharing data from objects connected to an Internet network, the storage and sharing device being implemented in a local area network and able to allow a control device connected to the local area network to browse among the stored data and to command the reading of a selected item of data in the data storage and sharing device by a rendering device connected to the local area network, the data storage and sharing device including a plurality of data loading interfaces in relation to separate communication protocols, each interface being configured so as to receive, in a communication protocol specific to said interface, data from at least one object connected to the Internet network.

Thus, by virtue of a single device, a communication terminal is able to access the data coming from all of its connected objects, even when these use separate communication protocols and/or when the communication terminal does not use the communication protocol of the connected object whose data are consulted by the terminal.

Advantageously, the data storage and sharing device records all of the data received from a connected object in one and the same dataset.

Thus, the consultation time for the data coming from a connected object in the storage and sharing device is reduced, as the terminal consults a set stored in this device, and not a plurality of separately stored data.

Advantageously, the data storage and sharing device records a data identifier in association with an item of data received from a connected object.

The data storage and sharing device thus allows consultation of the data not only by object but also by type of data, for example by searching among the data stored on the identifier.

Advantageously, the data storage and sharing device includes an aggregator for aggregating the data coming from a plurality of connected objects via the separate loading interfaces.

The terminal consulting the data stored in the storage device thus receives aggregated information containing all of the consulted stored data, thus reducing the resources necessary to transmit the consulted data between the storage and sharing device and the terminal. Furthermore, this simplifies the use of the data consulted by the terminal, in particular when the terminal includes a rendering device, the rendering device includes a reproducer for reproducing the received aggregated information but not a processing device for formatting a plurality of received data possibly coming from a plurality of objects.

Advantageously, the data storage and sharing device is a media server complying with the DLNA standard.

The storage and the sharing of data coming from connected objects thus shares the same infrastructure as the storage and the sharing of multimedia data, reducing the number of devices in a local area network and connected to the local area network. Specifically, either a specific storage and sharing device for the data from connected objects is added to the architecture, or a multimedia data storage and sharing device, also called media server in the DLNA, UPnP and equivalent standards, is designed in particular so as to include the loading interfaces specific to the storage and sharing of the data from connected objects.

One aim of the invention is also a method for storing and sharing data from connected objects, the storage and sharing method being implemented in a local area network and making it possible, by way of a control device connected to the local area network, to browse among the stored data and to command the reading of a selected item of data by a rendering device connected to the local area network, the data storage and sharing method including a plurality of data loading operations in relation to separate communication protocols, each loading operation making it possible to receive, in a communication protocol specific to said loading operation, data from at least one object connected to the Internet network.

Advantageously, the data storage and sharing method includes periodically triggering the loading of data from a connected object.

The stored data thus correspond to the current value of the data from the connected object.

Advantageously, the data loading operation includes monitoring the transmissions of the connected object triggering the reception of the data transmitted by the connected object.

The resources of the storage and sharing device are thus activated only when they are used, in particular to receive data from connected objects.

Advantageously, the loading operation is performed directly from the connected object.

Transmission errors are thus reduced, since the data are transmitted directly from the connected object to the storage and sharing device without an intermediary.

Advantageously, one alternative proposes for the loading operation to be performed from a mediation device that has received the data from the connected object.

The resources of the connected object are thus optimized since, if it performs a loading operation on a mediation device connected to the Internet network, the connected object will not have to retransmit the same data, but these will be loaded by the storage and sharing device from the mediation device that has already received them.

Advantageously, according to one implementation of the invention, the various steps of the method according to the invention are implemented by software or a computer program, this software comprising software instructions intended to be executed by a data processor of a device for storing and sharing data from connected objects and being designed to command the execution of the various steps of this method.

The invention therefore also targets a program comprising program code instructions for executing the steps of the data storage and sharing method when said program is executed by a processor.

One aim of the invention is also a method for rendering data coming from connected objects on a rendering device connected to a local area network, the rendering method including reading data selected from among data stored by a data storage and sharing device that has received these data from objects connected to the Internet network by way of loading interfaces of the data storage and sharing device in relation to separate communication protocols, the reading having been commanded by a control device connected to the local area network, the control device making it possible to browse and select from among the stored data.

Advantageously, the data rendering method is implemented by a media rendering device of a DLNA local area network architecture.

Advantageously, according to one implementation of the invention, the various steps of the method according to the invention are implemented by software or a computer program, this software comprising software instructions intended to be executed by a data processor of a device forming part of a communication terminal and being designed to command the execution of the various steps of this method.

The invention therefore also targets a program comprising program code instructions for executing the steps of the data rendering method when said program is executed by a processor.

These programs may use any programming language, and be in the form of source code, object code, or intermediate code between source code and object code, such as in a partially compiled form, or in any other desirable form.

BRIEF DESCRIPTION OF THE DRAWINGS

The features and advantages of the invention will become more clearly apparent upon reading the description, given by way of example, and the attached figures, in which.

DETAILED DESCRIPTION OF ILLUSTRATIVE EMBODIMENTS

An exemplary embodiment of the invention makes it possible to provide a unified user experience for consulting the data provided by objects connected to a home network. It hinges on a protocol implementing a storage and sharing device, such as UPnP, DLNA or an equivalent standard. It in particular extends the functionality of the storage and sharing device, also called media server in these standards, so as to make available data coming from connected objects. The user may in particular use any control device, also called control point, or digital media controller, DMC in these standards, such as a television, a smartphone etc. with which he is familiar for consuming audio and/or video content so as to consult the data coming from sensors connected to the home network, in particular sensors in his home (humidity, temperature, electricity meter, etc.). The data will then be rendered on a rendering device, also called digital media player or renderer, DMP or DMR in these standards.

Figure 1:
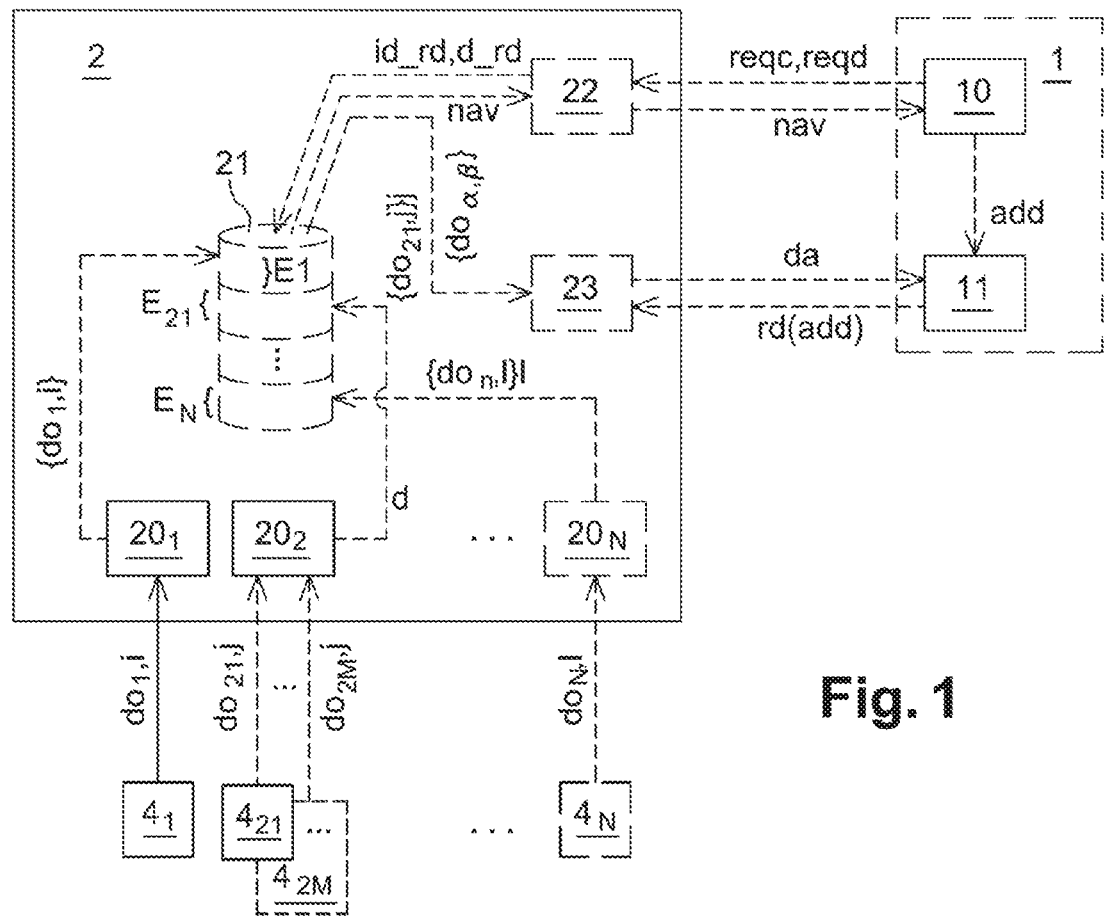
FIG. 1 shows a communication architecture including a storage and sharing device according to the invention.

FIG. 1 illustrates a communication architecture including a storage and sharing device according to the invention, The storage and sharing device 2 according to the invention is a particular storage and sharing device, also called media server for connected objects (media server for IoT or MS_IoT). It is in particular responsible for aggregating the data from a plurality of connected objects using in particular a plurality of separate communication protocols.

The device 2 for storing and sharing data from objects connected to an Internet network is implemented in a local area network. It is configured so as to allow a control device 10 connected to the local area network to browse among the stored data and to command the reading of a selected item of data in the data storage and sharing device 2 by a rendering device 11 connected to the local area network. The data storage and sharing device includes a plurality of data loading interfaces $20_1, 20_2, \ldots, 20_N$ in relation to separate communication protocols. Each interface $20_1, 20_2, \ldots, 20_N$ receives data $do_{1,i}, do_{21,j}, \ldots, do_{2M,j}, \ldots, do_{N,l}$ from at least one object $4_1, 4_{21} \ldots 4_{2M}, \ldots, 4_N$ connected to the Internet network.

The loading interfaces are in particular implemented in the form of a plug-in. The role of the loading interface is to enrich the storage and sharing device with the data collected from connected objects using separate communication protocols. Let us take a first loading interface $20_1$ in relation to a first connected object $4_1$: this implements the communication protocol of the first connected object, hereinafter called first communication protocol. For example, the first loading interface $20_1$ includes a data receiver using this first communication protocol. The first loading interface thus collects the data coming from the first connected object and also, possibly, from other connected objects using the same first communication protocol.

A loading interface may possibly receive the data from a single type of object, from a plurality of types of connected objects using the same communication protocol (proprietary protocol: a plurality of objects of the same brand, protocol in accordance with a standard: for example LoRa).

In particular, the data storage and sharing device 2 includes an aggregator 23 for aggregating the data $do_{1,i}$, $do_{21,j}$ ..., $do_{2M,j}$, ..., $do_{N,l}$ coming from a plurality of connected objects via the separate loading interfaces.

In particular, the data storage and sharing device 2 records all of the data $\{do_{1,i}\}_i$, $\{do_{21,j}\}_j$ ... $\{do_{2M,j}\}_j$, ..., $\{do_{N,l}\}_l$ received from a connected object, respectively, $4_1$, $4_{21}$ ... $4_{2M}$, ..., $4_N$, in one and the same dataset $E_1$, $E_{21}$ ... $E_{2M}$, ..., $E_N$.

In particular, the data storage and sharing device 2 is a media server complying with a standard of DLNA or UPnP type.

FIG. 1 shows a communication architecture including, besides the storage and sharing device, in particular:

Connected objects $4_1$, $4_{21}$ ... $4_{2M}$, ..., $4_N$;
A control device 10;
A rendering device 11.

A communication terminal 1 possibly includes the control device 1 and/or the rendering device 11.

The storage and sharing device 2 includes a plurality of loading interfaces $20_1$, $20_2$, ..., $20_N$. It includes in particular one loading interface per communication protocol. A loading interface $20_1$, $20_N$, respectively $20_2$, may thus receive data from a single connected object $4_1$, $4_N$ or from a plurality of connected objects $4_{21}$ ... $4_{2M}$.

The loading interfaces $20_1$, $20_2$, ..., $20_N$ receive the data either directly from the connected objects $4_1$, $4_{21}$ ... $4_{2M}$, ..., $4_N$, as shown in FIG. 1, or via a mediation device $3n$ (not illustrated by FIG. 1). In particular, an object $4_n$ connected to an Internet network transmits its data to a mediation device $3_n$ connected to the Internet network. The storage and sharing device 2 of the local area network will receive the data from the connected object $4_n$ that are transmitted by the mediation device $3n$ connected to the local area network. The connected objects $4_1$, $4_{21}$ ... $4_{2M}$, ..., $4_N$ may thus be implemented in or outside of the local area network. A mediation device $3_n$ connected to the local area network makes it possible to relay their data $do_{n,k}$ to the storage and sharing device 2.

The storage and sharing device 2 in particular includes a memory 21, such as a database, in which the data $\{do_{1,i}\}_i$, $\{do_{21,j}\}_j$ ... $\{do_{2M,j}\}_j$, ..., $\{do_{N,l}\}_l$ coming from the connected objects $4_1$, $4_{21}$ ... $4_{2M}$, ..., $4_N$ are recorded. The loading interface thus provides the memory 21, in particular the database of the content directory service of the media server in accordance with the DLNA, UPnP or equivalent standard, with the collected data.

If the device 2 for storing and sharing data coming from connected objects $4_1$, $4_{21}$ ... $4_{2M}$, ..., $4_N$ is a multimedia data storage and sharing device, either the memory 21 is a first memory allowing the recording of data $\{do_{1,i}\}_i$, $\{do_{21,j}\}_j$ ... $\{do_{2M,j}\}_j$, ..., $\{do_{N,l}\}_l$ coming from connected objects $4_1$, $4_{21}$ ... $4_{2M}$, ..., $4_N$ and the storage and sharing device 2 includes a second memory (not illustrated) for recording the multimedia data, or the multimedia data are also recorded in the memory 21.

In particular, the storage and sharing device 2 includes a sharing interface 22 receiving requests, respectively reqc, reqd, from a control device 10. In particular, the sharing interface 22 searches and reads from the memory 21 either the available data id_rd at least whose identifiers nav it transmits to the control device 10, or the selected data d_rd, for example from among those whose identifiers nav it has received, using the control device.

If the sharing interface 22 searches the selected data using the control device 10, in particular following a command reqd from the control device 10, the data $\{do_{\alpha\beta}\}$ read by the sharing interface 22 from the memory 21 are transmitted to an aggregator 23. After generation of aggregated information da by the aggregator 23 from the read data $\{do_{\alpha\beta}\}$, either the aggregated information da is transmitted directly to a rendering device 11, or an address add, for example in the memory 21 or another memory of the storage and sharing device 2 in which the aggregated information da generated by the aggregator 23 may be consulted rd(add) by the rendering device 11 is transmitted to the control device 10.

When using the UPnP protocol, the aggregator 23 supplies in particular an item such as:

<item id="8987234312" restricted="0" parentID="1">
<dc:title>1200 kWh</dc:title>
<upnp:class>object.item</upnp:class>
</item> whose main property is the title of the item, since it represents the data to be rendered by the rendering device 11. This is a generic item without a particular type, not audio, or video, etc., with which no resource is associated because there is no content to be consumed.

Figure 2:
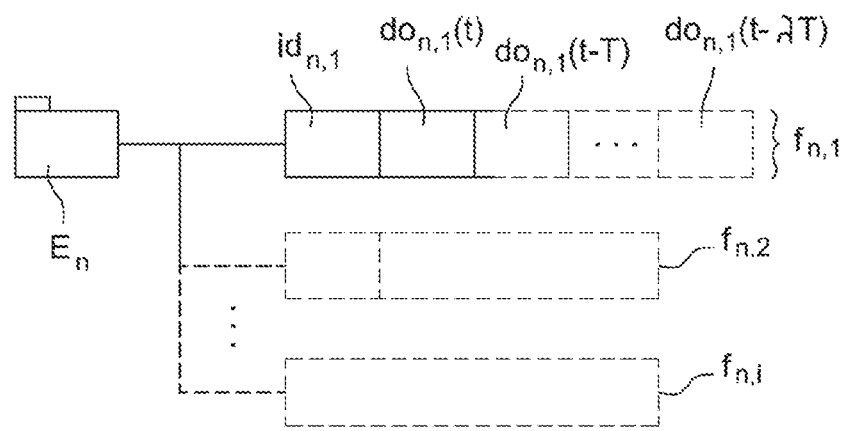
FIG. 2 shows an example of recording data coming from connected objects by a storage and sharing device according to the invention.

FIG. 2 illustrates an example of recording data coming from connected objects by a storage and sharing device according to the invention.

In particular, the data storage and sharing device 2 records all of the data $\{do_{n,i}\}_i$ received from a connected object $4_n$ in one and the same dataset $E_n$, for example one and the same container or one and the same directory in the memory 21.

In particular, the data storage and sharing device 2 records a data identifier $id_{n,i}$ in association with an item of data $do_{n,i}$ received from a connected object.

The storage and sharing device 2 thus forms the bridge between the various proprietary or standardized protocols of the connected objects and the communication protocol used by the local area network, in particular DLNA, UPnP, or an equivalent standard so as to utilize the data coming from the connected objects and to render them to control devices, a rendering device and other communication terminals.

When the storage and sharing device 2 according to the invention is in accordance with one of the UPnP, DLNA or equivalent standards, it may then hinge on equivalent discovery (for example SSDP), browsing (for example browsing) and notification (for example GENA) protocols.

FIG. 2 shows an exemplary dataset En of an object $4n$, which data are stored in the memory 21 in the form of a directory. The data $do_{n,1}$, $do_{n,2}$ ..., $do_{n,i}$ received from the connected object $4n$ are associated with a data identifier, respectively $id_{n,1}$, $id_{n,2}$ ..., $id_{n,i}$. For example, they are recorded in one and the same file, respectively $f_{n,1}$, $f_{n,2}$ ..., $f_{n,i}$.

Let us consider a home network including 2 connected objects: an electricity meter supplying the electricity consumption of the household and a temperature and humidity sensor. The data coming from the connected objects may be written as follows in the storage and sharing device:

In a first container associated with a data identifier "ELECTRICITY METER", an item of data "1200 kWh";

In a second container associated with a data identifier "NetAtmo Sensors", two files:
  A first file in which an identifier of the item of data "temperature" and its value "21° C." is written: "temperature 21° C.", and
  A second file in which an identifier of the item of data "humidity" and its value "50%" is written: "Humidity 50%"

In particular, the data $do_{n,i}(t)$ coming from a connected object are recorded by deleting the previous data $do_{n,i}(t-T)$ corresponding to the same associated identifier $id_{n,i}$ in the memory 21. Saturation of the memory is thus avoided.

As an alternative, when the data $do_{n,i}(t)$ are received at repeatedly, in particular periodically, from a connected object 4n, they may be recorded in association with a data identifier $id_{n,i}$ in addition to the data $do_{n,i}(t-T)$ already stored in association with this same identifier $id_{n,i}$, for example in the same file $f_{n,i}$. A log of the data coming from one or more connected objects may thus be consulted, and calculations may possibly be performed, in particular statistics, regarding the evolution of these data, in particular in order to control a rendering device.

For example, the connected objects consist of various temperature, humidity and sunlight sensors in several rooms of a building and possibly outdoors, and the evolution of the data will possibly make it possible to control the heating system, the windows, the blinds, the irrigation system and various other controllable devices of the building in advance and no longer in retrospect.

Figure 3:
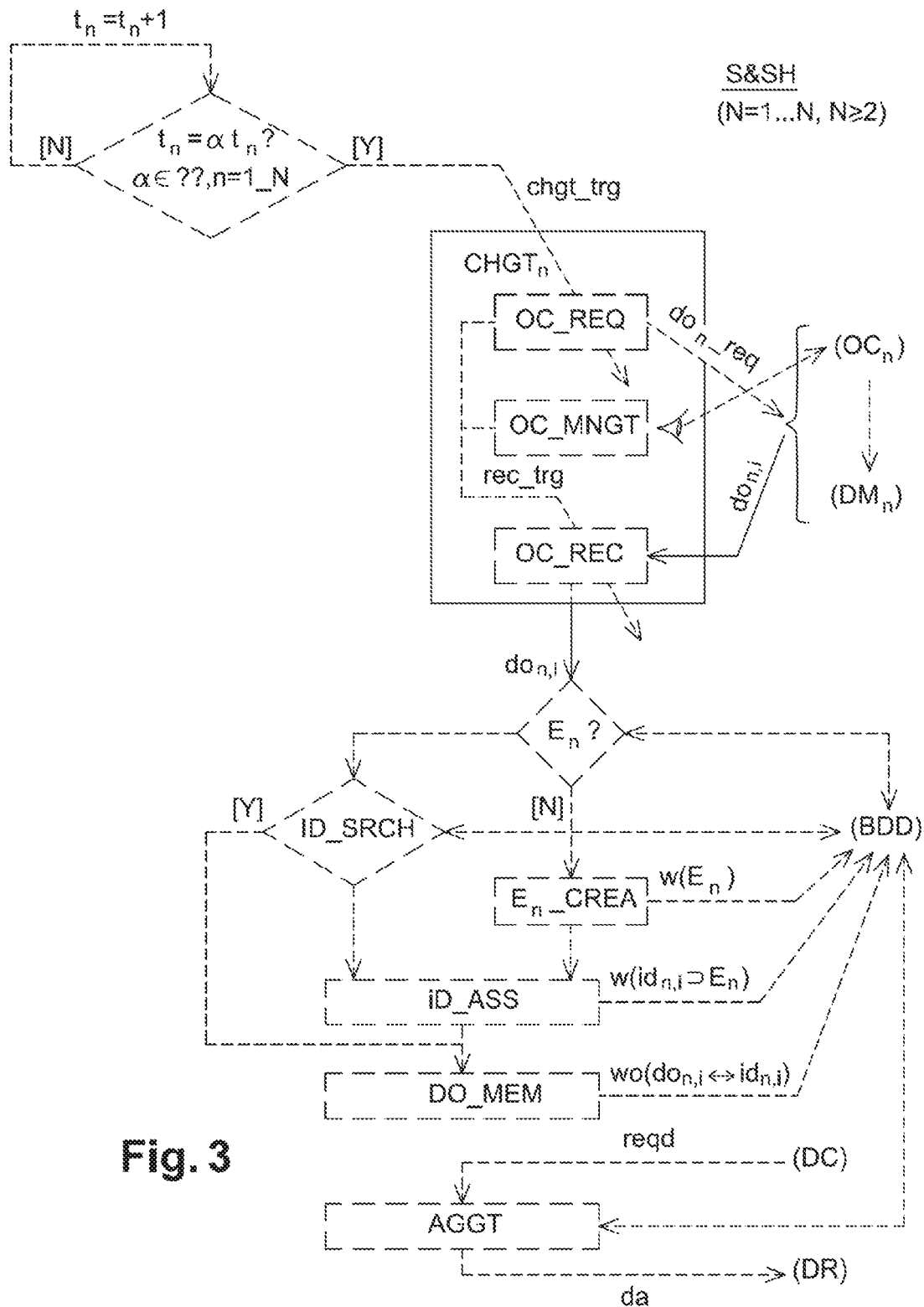
FIG. 3 shows a simplified diagram of a storage and sharing method according to the invention.

FIG. 3 illustrates a simplified diagram of a storage and sharing method according to the invention.

The method S&SH for storing and sharing data from connected objects is implemented in a local area network. By way of a control device 10 connected to the local area network, it makes it possible to browse among the stored data and to command the reading of a selected item of data by a rendering device 11 connected to the local area network. The data storage and sharing method S&SH includes a plurality of data loading operations CHGTn, n=1 . . . N, N≥2 in relation to separate communication protocols. Each loading operation CHGTn makes it possible to receive, in a communication protocol specific to said loading operation, data from at least one object OCn connected to the Internet network.

In particular, the data storage and sharing method S&SH includes periodically Tn triggering cht_trg the loading of data CHGTn from a connected object OCn. In particular, the data storage and sharing method S&SH includes an end of period check tn=αTn ?, α being an integer and n=1 . . . N at each instant tn. If the end of period is reached [Y], it triggers the loading operation chgt_trg. If not [N], it moves to the following instant tn=tn+1.

In particular, the data loading operation CHGTn includes monitoring OC_MNT the transmissions of the connected object OCn triggering the reception OC_REC of the data $do_{n,i}$ transmitted by the connected object OCn.

In particular, the loading operation CHGTn is performed directly from the connected object OCn. As an alternative to the direct loading operation, the loading operation CHGTn is performed from a mediation device DMn that has received the data from the connected object OCn.

The data loading operation CHGTn includes monitoring, in particular when the connected object OCn or the mediation device DMn automatically transmits the data, that is to say that it operates in what is known as "push" mode.

As an alternative, the data loading operation CHGTn includes a demand for data OC_REQ either directly to a connected object OCn or to a mediation device DMn, which transmits a request $do_n$_req to the device in question. The connected object OCn or the mediation device DMn receiving the request will then transmit $do_n$_req the data $do_{n,i}$. It is then said that it operates in what is known as "pull" mode.

In particular, the storage and sharing method S&SH includes a check En ? for the existence of a dataset associated with the connected object in the memory BDD. If no set exists [N], the storage and sharing method includes creating a set En_CREA associated with the object OCn and recorded w(En) in the memory BDD, in particular in the form of a container or of a directory.

If a set En exists [Y], the storage and sharing method searches in particular for an identifier ID_SRCH ? corresponding to the item of data $do_{n,i}$ received from the connected object in the set En. If this identifier does not exist [N] or if no set exists [N], the storage and sharing method includes associating an identifier ID_ASS with the received item of data $do_{n,i}$, in particular by writing $x(id_{n,i} \supset En)$ the identifier to the set En of the memory BDD.

In particular, the storage and sharing method S&SH includes recording the received item of data $do_{n,i}$, in particular by writing this item of data to the memory BDD. The received item of data $do_{n,i}$ is possibly written in association with an identifier $w(do_{n,i} \leftrightarrow id_{n,i})$, for example in a file, to a set En, or in a file of the set En to the memory BDD containing the identifier. In particular, if the search ID_SRCH finds [Y] the identifier in the memory BDD, the received item of data $do_{n,i}$ is written in association with the found identifier $w(do_{n,i} \leftrightarrow id_{n,i})$ to the memory BDD.

In particular, the storage and sharing method S&SH includes, in a consultation of the stored data, aggregating AGGT the consulted data. For example, a control device DC transmits a data request reqd to read the selected stored data. The aggregation AGGT recovers the data stored in the memory on the basis of the received data request reqd and generates aggregated information da, which is transmitted to a rendering device DR.

The storage and sharing method S&SH possibly includes generating NAV_GN a browser page on the basis of the data identifiers stored in the memory (not illustrated). This generation ANV_GN is in particular triggered by receiving a consultation request reqc coming from a control device DC. The storage and sharing method S&SH in particular includes transmitting the generated browser page nav to the control device. The control device DC or a user of the control device, by way of a human-machine interface of the control device, is thus able to select, from this browser page nav, data from among the data stored in the memory BDD. The data provided on this page are in particular raw data without formatting.

The storage and sharing method may be implemented by a program comprising program code instructions for executing the steps of the data storage and sharing method when said program is executed by a processor.

Figure 4:
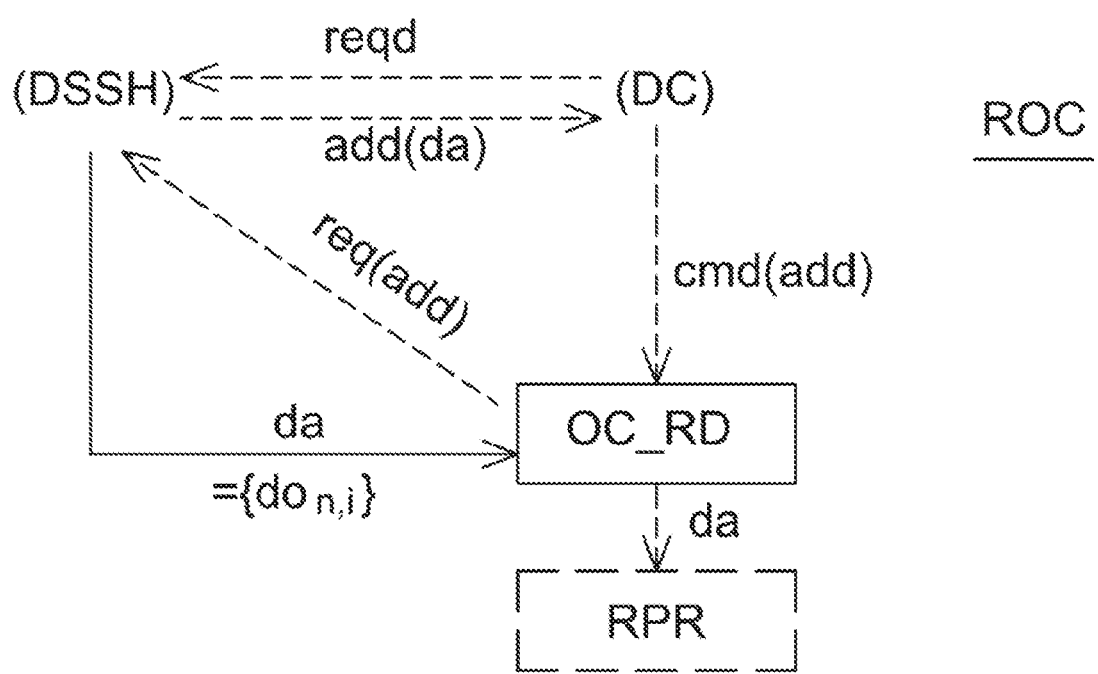
FIG. 4 shows a simplified diagram of a method for rendering data coming from connected objects according to the invention.

FIG. 4 illustrates a simplified diagram of a method for rendering data coming from connected objects according to the invention.

The method ROC for rendering data coming from connected objects on a rendering device connected to a local area network includes reading OC_RD data selected from among the data stored by a data storage and sharing device that has received these data from objects connected to the Internet network by way of loading interfaces of the data storage and sharing device. The reading OC_RD is commanded by a control device DC connected to the local area network, the control device DC making it possible to browse and to select from among the stored data.

In particular, the data rendering method ROC is implemented by a media rendering device of a DLNA or UPnP local area network architecture.

In particular, the control device sends a data request reqd to the storage and sharing device DSSH, which
either directly transmits aggregated information da containing the requested data da={$do_{n,i}$} to the rendering method ROC, which reads OC_RD the aggregated information da,
or transmits an address add(da) to the control device DC, at which address the aggregated information is able to be read. The control device DC then commands cmd (add) the reading OC_RD of the aggregated information. The reading OC_RD consults req(add) the supplied address and reads the aggregated information da there.

In particular, the rendering method ROC includes reproducing RPR the aggregated information.

In particular, the rendering method ROC may also include a calculation (not illustrated) based on the aggregated information, making it possible in particular to control remotely controllable objects (at least in a local area network).

One embodiment of the rendering method is a program comprising program code instructions for executing the steps of the data rendering method when said program is executed by a processor.

Figure 5:
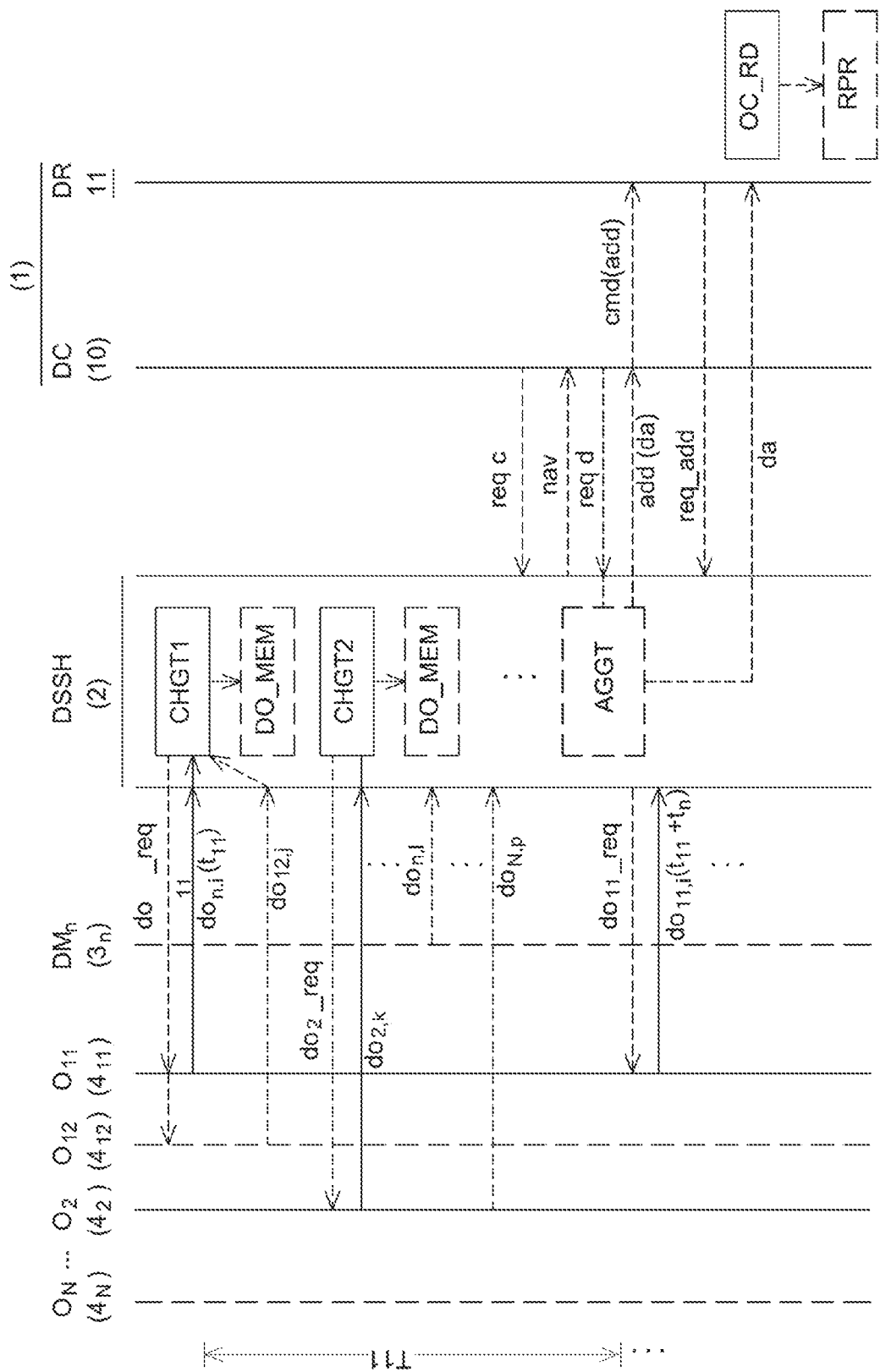
FIG. 5 shows a simplified diagram of the exchange during the implementation of a storage and sharing method, and of a rendering method according to the invention.

FIG. 5 illustrates a simplified diagram of the exchange during the implementation of a storage and sharing method, and of a rendering method according to the invention.

The connected objects $O_{11}(4_{11})$, $O_{12}(4_{12})$ use one and the same communication protocol. These connected objects $O_{11}(4_{11})$, $O_{12}(4_{12})$ and the connected objects $O_2 \ldots O_N$ are either implemented or connected to one and the same local area network, for example via an Internet network. The connected object $O_n(4_n)$, not shown in the figure, is connected to the Internet network, and it transmits data $do_{n,i}$ to a mediation device DMn via the Internet network.

A storage and sharing device DSSH(2) is implemented in the local area network. It implements a storage and sharing method. In particular, it implements a plurality of loading operations CHGT1, CHGT2:
a loading operation CHGT1 that receives the data $do_{11,i}$ ($t_{11}$), $do_{12,j}$, $do_{11,i}(t_{11}+T_{11})$ from the connected objects $O_{11}(4_{11})$ and $O_{12}(4_{12})$ using the same communication protocol,
a loading operation CHGT2 that receives the data $do_{2,k}$ from the connected object $O_2(4_2)$,
etc.
a loading operation CHGTn (not illustrated) that receives the data $do_{n,i}$ coming from the connected object $O_n(4_n)$ from the mediation device DMn,
etc.
a loading operation CHGTN (not illustrated) that receives the data $do_{N,p}$ from the connected object $O_N(4_N)$.

These data are stored DO-MEM in the storage and sharing device DSSH(2).

The loading operation CHGT1, CHGT2, etc. possibly requests do11_req, do2_req the data from the connected objects, respectively $O_{11}$ and $O_2$, which transmit the data following the reception of this request.

In particular, the loading operation CHGT1 is performed periodically (the period illustrated is equal to $T_{11}$).

A control device DC(10), in particular of a communication terminal 1, may request reqc consultation of the stored data from the storage and sharing device DSSH, which will return in particular a browser page nav.

The control device DC(10) may in particular request reqd stored data from the storage and sharing device DSSH, in particular selected from a previously received browser page nav. The storage and sharing device DSSH reads the requested data and transmits them to a rendering device DR, in particular in the form of aggregated information. In particular, the storage and sharing device DSSH aggregates the read requested data and supplies the aggregated information.

For example, either the storage and sharing device DSSH sends the control device an address add(da) at which the aggregated information is able to be consulted (the control device DC will then command cmd(add) reading OC_RD of this address by the rendering device DR, which will request req(add) the reading of the address; or the storage and sharing device DSSH directly sends the aggregated information da to the rendering device DR, which will read it OC_RD before possibly reproducing it RPR.

Figure 6:
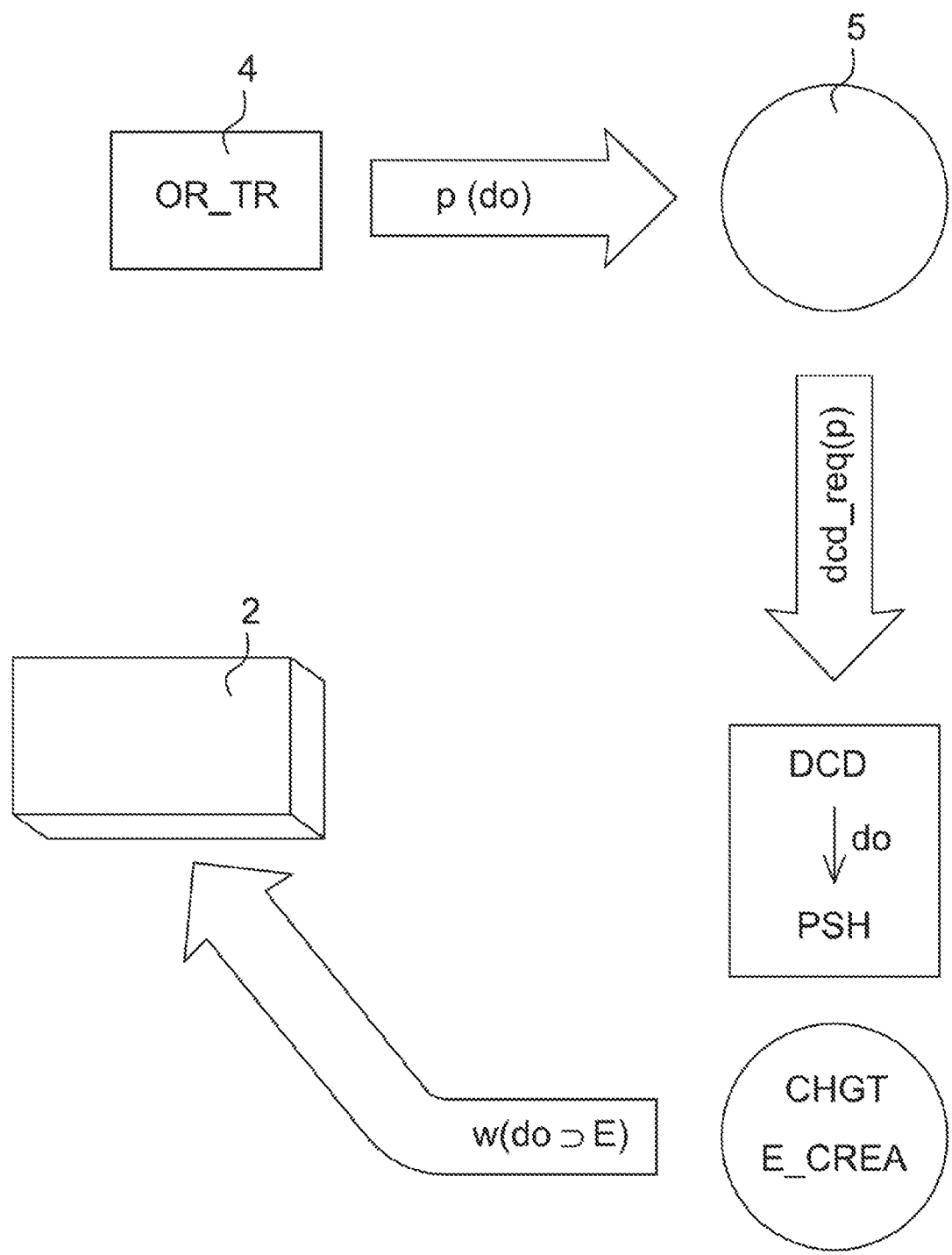
FIG. 6 shows a simplified diagram of one implementation of the invention during a push of the data to the storage and sharing device according to the invention.

FIG. 6 illustrates a simplified diagram of one implementation of the invention during a push of the data to the storage and sharing device according to the invention.

The connected object 4, for example a thermometer using the LoRa communication protocol, implements a transmission OR_TR that sends data, in particular in the form of a reading p(do), for example by frame, through a local area network, such as LoRaWAN, to a gateway using the same LoRa communication protocol. This gateway includes in particular a receiver antenna for receiving radio transmissions in accordance with the LoRa standard. The gateway in particular demodulates the received data and encapsulates them (in our example, encapsulates the frame) in a request in accordance with an Internet protocol, in particular an http request. The object is thus connected to the Internet network. The gateway sends the encapsulated data in an Internet request dcd_req(p) to a mediation device 3. The mediation device 3 is in particular a network server using the same communication protocol as the connected object 4, for example a LoRa network server.

The mediation device 3 decodes DCD the data received in the Internet request dcd_req(p). This decoding DCD makes it possible in particular to identify the connected object, possibly an identifier of the received item of data and the value of the received item of data, for example T°=22° C. The mediation device 3 then transmits PSH the received data to a storage and sharing device 2. This transmission PSH is in particular performed in "push" mode, that is to say automatically (without prior reception of a request for the data). The mediation device 3 thus sends the data do, in our example the reading, coming from the connected object 4 to a loading interface 20 of the storage and sharing device suited to the communication protocol of the connected object, in this case the LoRa protocol, in particular via a consultation address, also called "callback URL".

Following this notification of the storage device and the data do of the object 4, the loading interface 20 loads the data and files w(do ⊃ E) the data in the storage and sharing device 2. In particular, the data are assigned in relation to the connected object from which they originate: to this end, the loading interface for example creates a set E_CREA in the storage and sharing device that is assigned to the object in which the data are written. The database of the storage and sharing device 2, also called IoT (for "Internet of Things", that is to say objects connected to the Internet network) media server is thus updated by the loading interface 20.

The loading interface possibly associates a name with the identifier of the object, such as "lounge thermostat", which will be associated with the set assigned to the object in the database.

This technique makes it possible to aggregate the data from connected objects from various manufacturers, and allows a user to use standard terminals, in particular by way of a standard application, for example using UPnP, DLNA protocols or a standard protocol equivalent in terms of architecture in order to access said data.

The invention also targets a medium. The information medium may be any entity or device capable of storing at least one of the programs. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term "module" may correspond equally to a software component or to a hardware component. A software component corresponds to one or more computer programs, one or more subroutines of a program or, more generally, to any element of a program or of software that is able to implement a function or a set of functions in accordance with the above description. A hardware component corresponds to any element of a hardware assembly that is able to implement a function or a set of functions.

Although the present disclosure has been described with reference to one or more examples, workers skilled in the art will recognize that changes may be made in form and detail without departing from the scope of the disclosure and/or the appended claims.

The invention claimed is:

1. A data storage and sharing server comprising a processor and memory for storing and sharing data from objects connected to an Internet network, the storage and sharing server being implemented in a local area network, the storage and sharing server comprising:
   a non-transitory computer-readable medium comprising stored data from the connected objects; and
   a plurality of data loading interfaces, each data loading interface being configured to use its own communication protocols, each interface being configured so as to receive, in a communication protocol specific to said interface, data from at least one object connected to the Internet network and store the received data in the non-transitory computer-readable medium as the stored data, each data loading interface using distinct communication protocols, the data received by the storage and sharing server being data captured, sensed or generated by the at least one object,
   wherein the data storage and sharing server is configured to be connected via the local area network to enable:
      a control device connected to the local area network to browse through the data stored in the data storage and sharing server, the data storage and sharing server and the control device being distinct devices; and
      a rendering device connected to the local area network to read selected data stored in the data storage and sharing server in response to a command from the control device;
   the received data indicates a value of a physical condition sensed by the at least one object; and
   the at least one object comprises a sensor.

2. The data storage and sharing server as claimed in claim 1, wherein the data storage and sharing server records all of the data received from a connected object in one and the same dataset in the non-transitory computer-readable medium.

3. The data storage and sharing server as claimed in claim 1, wherein the data storage and sharing server records a data identifier in association with an item of data received from a connected object.

4. The data storage and sharing server as claimed in claim 1, wherein the data storage and sharing server includes an aggregator, which aggregates the data coming from a plurality of connected objects via the separate loading interfaces.

5. The data storage and sharing server as claimed in claim 1, wherein the data storage and sharing server is a media server complying with the DLNA standard.

6. A method comprising:
   sharing, by a data storage and sharing server, data received from connected objects that is stored in a non-transitory computer-readable medium in a local area network as stored data;
   the data storage and sharing server performing a plurality of data loading operations via a plurality of data loading interfaces, each data loading interface implementing a distinct communication protocol, each loading operation comprising receiving via a respective one of the loading interfaces, in a communication protocol specific to said loading operation and the loading interface, data from at least one object connected to the Internet network, wherein the data received is data that is captured, sensed or generated by the at least one object;
   storing the received data in the non-transitory computer-readable medium as the stored data; and
   enabling by the data storage and sharing server:
      browsing of the data stored in the data storage and sharing server by a control device connected to the local area network; and
      reading of a selected item of the data stored in the data storage and sharing server by a rendering device connected to the local area network in response to a command from the control device,
   wherein:
      the data storage and sharing server and the control device are distinct devices;
      the received data indicates a value of a physical condition sensed by the at least one object; and
      the at least one object comprises a sensor.

7. The method as claimed in claim 6, the method includes periodically triggering a loading operation of data from at least one of the connected objects.

8. The method as claimed in claim 6, wherein the data loading operation includes monitoring transmissions of the connected object triggering reception of the data transmitted by the connected object.

9. The method as claimed in claim 6, wherein the loading operation is performed directly from the connected object.

10. The data storage and sharing method as claimed in claim 6, wherein the loading operation is performed from a mediation device that has received the data from the connected object.

11. A non-transitory computer-readable medium comprising a computer program stored thereon for implementing a data storage and sharing method when said program is executed by a processor of a data storing and sharing server, wherein the instructions configure the data storing and sharing server to perform acts comprising:

sharing data from connected objects that is stored in a database in a local area network as stored data;

performing a plurality of data loading operations via a plurality of data loading interfaces, each data loading interface implementing a distinct communication protocol, each loading operation comprising receiving via a respective one of the loading interfaces, in a communication protocol specific to said loading operation and the loading interface, data from at least one object connected to the Internet network, wherein the data received is data that is captured, sensed or generated by the at least one object;

storing the received data in the database as the stored data;

allowing browsing of the data stored in the data storage and sharing server by a control device connected to the local area network, the data storage and sharing server and the control device being distinct devices; and allowing reading of a selected item of the data stored in the data storage and sharing server by a rendering device connected to the local area network in response to a command from the control device, wherein:

the received data indicates a value of a physical condition sensed by the at least one object; and the at least one object comprises a sensor.

* * * * *